United States Patent
Hung

(10) Patent No.: US 12,463,531 B2
(45) Date of Patent: Nov. 4, 2025

(54) MULTI-INPUT POWER SYSTEM WITH INRUSH CURRENT SUPPRESSION FUNCTION

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 221 days.

(21) Appl. No.: 18/540,052

(22) Filed: Dec. 14, 2023

(65) Prior Publication Data

US 2025/0167673 A1    May 22, 2025

(30) Foreign Application Priority Data

Nov. 17, 2023   (TW) .................................. 112144506

(51) Int. Cl.
- *H02M 1/42* (2007.01)
- *H02M 1/12* (2006.01)
- *H02M 3/24* (2006.01)

(52) U.S. Cl.
CPC ........... *H02M 1/4283* (2021.05); *H02M 1/12* (2013.01); *H02M 3/24* (2013.01); *H02M 1/4208* (2013.01); *H02M 1/4225* (2013.01); *H02M 1/4266* (2013.01)

(58) Field of Classification Search
CPC . H02M 1/4208; H02M 1/4225; H02M 1/4266
See application file for complete search history.

(56) References Cited

U.S. PATENT DOCUMENTS

| 7,898,111 B1 * | 3/2011 | Pistel | ...................... H02J 1/102 307/82 |
| 8,169,804 B2 * | 5/2012 | Tan | ..................... H02M 1/4216 363/65 |

FOREIGN PATENT DOCUMENTS

TW            I473376 B      2/2015

OTHER PUBLICATIONS

Office Action dated Aug. 2, 2024 of the corresponding Taiwan patent application No. 112144506.

* cited by examiner

*Primary Examiner* — Gary A Nash
(74) *Attorney, Agent, or Firm* — MUNCY, GEISSLER, OLDS & LOWE, P.C.

(57) ABSTRACT

A multi-input power system with an inrush current suppression function receives at least two input power sources, and includes at least two filter-rectification circuits, at least two boost PFC circuits, a current suppression circuit, and a DC-to-DC conversion circuit. Each filter-rectification circuit correspondingly receives the input power source, and converts the at least two input power sources into at least two rectified voltages. Each boost PFC circuit is correspondingly connected to the filter-rectification circuit, receives the rectified voltage, and performs a power factor correction to the rectified voltage to provide a conversion voltage. The current suppression circuit is connected to the at least two filter-rectification circuits and the at least two boost PFC circuits. The DC-to-DC is connected to the at least two boost PFC circuits and the current suppression circuit, receives the conversion voltage and converts the conversion voltage into an output voltage.

10 Claims, 3 Drawing Sheets

MULTI-INPUT POWER SYSTEM WITH INRUSH CURRENT SUPPRESSION FUNCTION

BACKGROUND

Technical Field

The present disclosure relates to a multi-input power system, and more particularly to a multi-input power system with an inrush current suppression function.

Description of Related Art

The statements in this section merely provide background information related to the present disclosure and do not necessarily constitute prior art.

Please refer to FIG. 1, which shows a block circuit diagram of a related-art dual-input switching power converter with an inrush current suppression circuit. As shown in FIG. 1, each AC input is connected in series with a negative temperature resistor, that is, a first negative temperature resistor R91 is connected to a first input power source Vin1, and a second temperature resistor R92 is connected to a second input power source Vin2, and the negative temperature resistors R91, R92 are used to achieve the function of instantaneous inrush current limit.

Please refer to FIG. 2, which shows a block circuit diagram of another related-art dual-input switching power converter with an inrush current suppression circuit. Compared with the inrush current suppression circuit shown in FIG. 1, the first negative temperature resistor R91 and the second negative temperature resistor R92 are connected not on the AC input side, but respectively between a first rectifier 121 and a first PFC converter 131 (for the first negative temperature resistor R91), and between a second rectifier 122 and a second PFC converter 132 (for the second negative temperature resistor R92). Similarly, the function of instantaneous inrush current limit can be implemented.

For either the circuit application shown in FIG. 1 or FIG. 2, the number of negative temperature resistors used is consistent with the number of input power supplies. In other words, for a multi-input power system, once the number of input power sources increases, the number of negative temperature resistors required will inevitably increase. Therefore, such an overall power supply structure design is relatively complex, and it is difficult to achieve a minimal design in terms of component, cost, and volume.

Therefore, how to design a multi-input power system with an inrush current suppression function to solve problems and technical bottlenecks in the existing technology has become a critical topic in this field.

SUMMARY

An objective of the present disclosure is to provide a multi-input power system with an inrush current suppression function. The multi-input power system receives at least two input power sources. The receive at least two input power sources includes at least two filter-rectification circuits, at least two boost power factor correction circuits, a current suppression circuit, and a DC-to-DC conversion circuit. The at least two filter-rectification circuits respectively receive the at least two input power sources, and convert the at least two input power sources into at least two rectified voltages. Each boost power factor correction circuit is correspondingly connected to the filter-rectification circuit, and receives the rectified voltage and perform a power factor correction to the rectified voltage to provide a conversion voltage. The current suppression circuit is connected to the at least two filter-rectification circuits and the at least two boost power factor correction circuits. The DC-to-DC conversion circuit is connected to the at least two boost power factor correction circuits and the current suppression circuit, and the DC-to-DC conversion circuit receives the conversion voltage and convert the conversion voltage into an output voltage.

In one embodiment, the current suppression circuit includes at least two diodes and a resistor. Each diode includes an anode and a cathode. The resistor includes a first terminal and a second terminal. The anodes of the at least two diodes are respectively connected to the at least two filter-rectification circuits and the at least two boost power factor correction circuits, and the cathodes of the at least two diodes are commonly connected to a first node. The resistor is connected between the first node and a second node where the conversion voltage is.

In one embodiment, the anode of each diode receives the rectified voltage.

In one embodiment, each boost power factor correction circuit includes a boost inductor, a boost switch, and a boost diode. The boost inductor includes a first terminal and a second terminal. The boost switch includes a first power terminal, a second power terminal, and a control terminal. The boost diode includes an anode and a cathode. The first terminal of the boost inductor is connected to the filter-rectification circuit and the anode of the diode, and the second terminal of the boost inductor is connected to the first power terminal of the boost switch and the anode of the boost diode; the cathode of the boost diode is connected to the second node; the second power terminal of the boost switch is grounded.

In one embodiment, the multi-input power system further includes at least two voltage-dividing circuits. The at least two voltage-dividing circuits respectively receive the conversion voltage, and divide the conversion voltage into at least two divided voltages.

In one embodiment, each boost power factor correction circuit further includes a controller. The controller receives the divided voltage, and controls a turned-on time and/or a turned-off time of the boost switch according to the divided voltage so as to control the conversion voltage.

In one embodiment, each voltage-dividing circuit includes a first voltage-dividing resistor and a second voltage-dividing resistor. Each voltage-dividing circuit correspondingly receives the conversion voltage provided from the boost power factor correction circuit, and divide the conversion voltage according to a resistance ratio between the first voltage-dividing resistor and the second voltage-dividing resistor to generate the divided voltage across the second voltage-dividing resistor.

In one embodiment, the multi-input power system further a capacitor. The capacitor includes a first terminal and a second terminal, and the first terminal of the capacitor receives the conversion voltage and the second terminal of the capacitor is grounded.

In one embodiment, the resistor is a thermistor with a negative temperature coefficient.

In one embodiment, the at least two boost power factor correction circuits share the DC-to-DC conversion circuit, and convert the conversion voltage into the output voltage.

Accordingly, the multi-input power system with the inrush current suppression function proposed by the present disclosure has the following characteristics and advantages:

(1) the inrush current suppression function can be applied to multi-input AC and/or power structure; (2) the simplify overall power structure design can be implemented; (3) since only one NTC thermistor is used, the design can be minimized in terms of component, cost, and volume.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
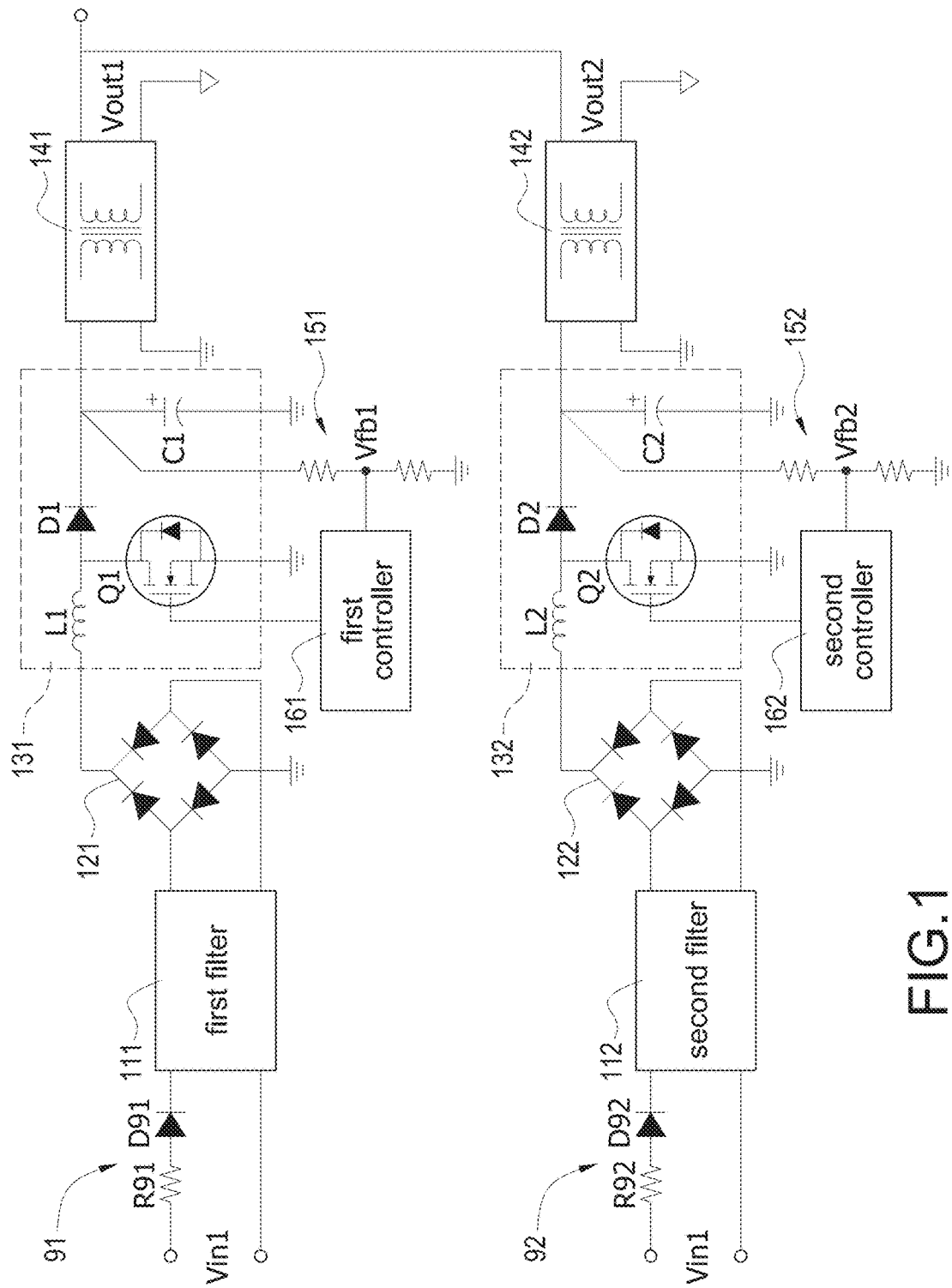
FIG. 1 is a block circuit diagram of a related-art dual-input switching power converter with an inrush current suppression circuit.

Reference will now be made to the drawing figures to describe the present disclosure in detail. It will be understood that the drawing figures and exemplified embodiments of present disclosure are not limited to the details thereof.

Figure 3:
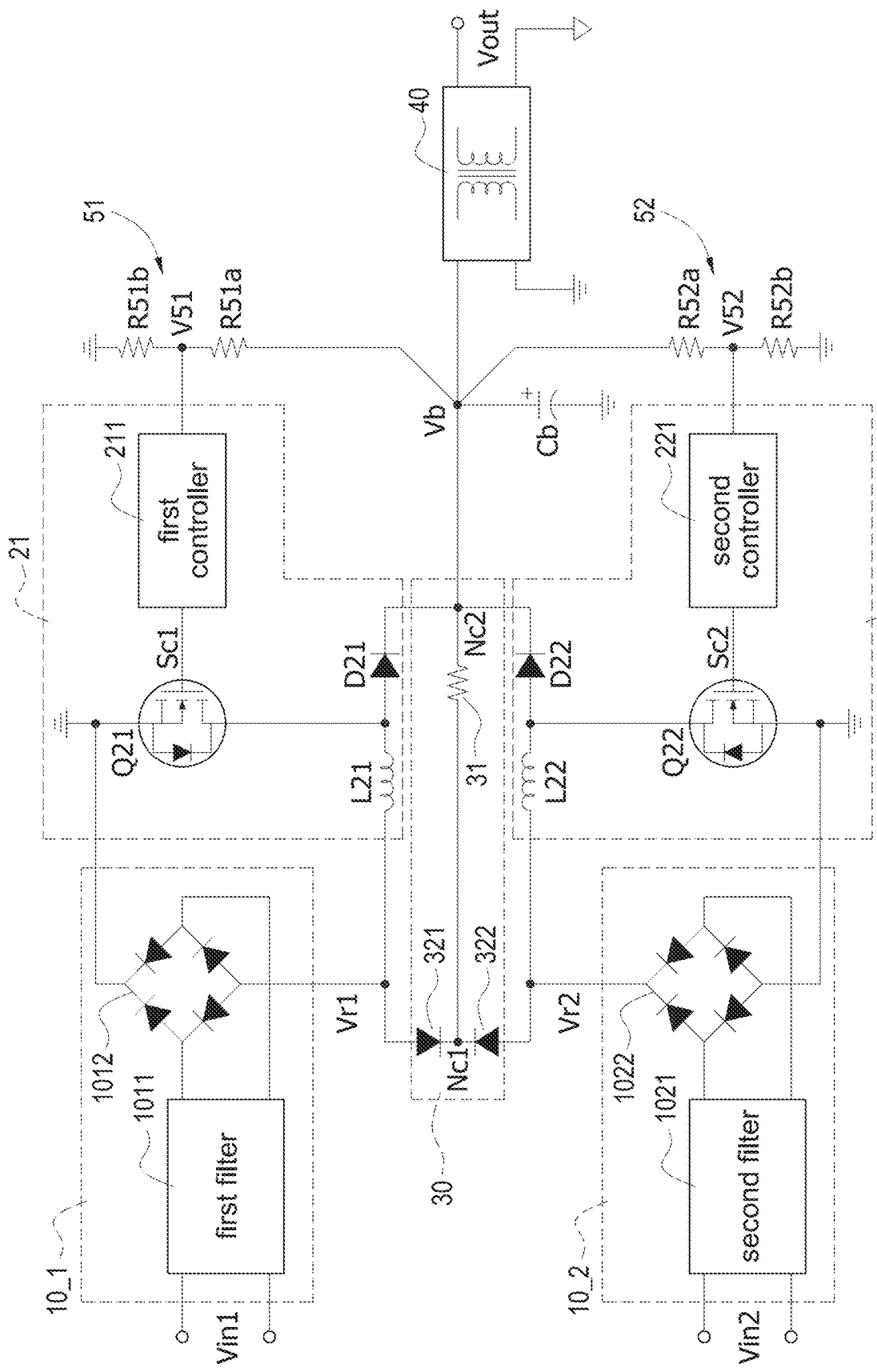
FIG. 3 is a block circuit diagram of a multi-input power system with an inrush current suppression function according to the present disclosure.

Please refer to FIG. 3, which shows a block circuit diagram of a multi-input power system with an inrush current suppression function according to the present disclosure. The multi-input power system with the inrush current suppression function (hereinafter abbreviated as "multi-input power system") receives at least two input power sources Vin1, Vin2. However, although two input power sources Vin1, Vin2 are shown in FIG. 3, the multi-input power supply system of the present disclosure may receive more than two input power sources. The multi-input power system includes at least two filter-rectification circuits 10_1, 10_2, at least two boost power factor correction circuits 21, 22, a current suppression circuit, and a DC-to-DC conversion circuit 40.

The at least two filter-rectification circuits 10_1, 10_2 respectively receive the at least two input power sources Vin1, Vin2, and convert the at least two input power sources Vin1, Vin2 into at least two rectified voltages Vr1, Vr2. Taking the embodiment in FIG. 3 as an example, the two filter-rectification circuits 10_1, 10_2 include a first filter-rectification circuit 10_1 and a second filter-rectification circuit 10_2. The first filter-rectification circuit 10_1 receives the first input power source Vin1, and converts the first input power source Vin1 into a first rectified voltage Vr1. The second filter-rectification circuit 10_2 receives the second input power source Vin2, and converts the second input power source Vin2 into a second rectified voltage Vr2.

Each boost power factor correction circuit 21, 22 is correspondingly connected to the filter-rectification circuit 10_1, 10_2, and receives the rectified voltage Vr1, Vr2 and performs a power factor correction to the rectified voltage Vr1, Vr2 to provide a conversion voltage Vb. Taking the embodiment in FIG. 3 as an example, the two boost power factor correction circuits 21, 22 include a first boost power factor correction circuit 21 and a second boost power factor correction circuit 22. The first boost power factor correction circuit 21 is connected to the first filter-rectification circuit 10_1, and receives the first rectified voltage Vr1 and performs a power factor correction to the first rectified voltage Vr1 to provide the conversion voltage Vb. The second boost power factor correction circuit 21 is connected to the second filter-rectification circuit 10_2, and receives the second rectified voltage Vr2 and performs a power factor correction to the second rectified voltage Vr2 to provide the conversion voltage Vb.

As shown in FIG. 3, each boost power factor correction circuit 21, 22 includes a boost inductor L21, L22, a boost switch Q21, Q22, and a boost diode D21, D22. The boost inductor L21, L22 includes a first terminal and a second terminal. The boost switch Q21, Q22 includes a first power terminal, a second power terminal, and a control terminal. The boost diode D21, D22 includes an anode and a cathode.

The first terminal of the boost inductor L21, L22 is connected to the corresponding filter-rectification circuit 10_1, 10_2 and the anode of the corresponding diode 321, 322. The second terminal of the boost inductor L21, L22 is connected to the first power terminal of the boost switch Q21, Q22 and the anode of the boost diode D21, D22. The cathode of the boost diode D21, D22 is connected to the second node Nc2. The second power terminal of the boost switch Q21, Q22 is grounded.

As shown in FIG. 3, the first boost power factor correction circuit 21 includes a first boost inductor L21, a first boost switch Q21, and a first boost diode D21. The second boost power factor correction circuit 22 includes a second boost inductor L22, a second boost switch Q22, and a second boost diode D22.

The first terminal of the first boost inductor L21 is connected to the first filter-rectification circuit 10_1 and the anode of the first diode 321, and receive the first rectified voltage Vr1 filtered and rectified by the first filter-rectification circuit 10_1. The second terminal of the first boost inductor L21 is connected to the first power terminal of the first boost switch Q21 and the anode of the first boost diode D21. The cathode of the first boost diode D21 is connected to the second node Nc2. The second power terminal of the first boost switch Q21 is grounded. The first terminal of the second boost inductor L22 is connected to the second filter-rectification circuit 10_2 and the anode of the second diode 322, and receive the second rectified voltage Vr2 filtered and rectified by the second filter-rectification circuit 10_2. The second terminal of the second boost inductor L22 is connected to the first power terminal of the second boost switch Q22 and the anode of the second boost diode D22. The cathode of the second boost diode D22 is connected to the second node Nc2. The second power terminal of the second boost switch Q22 is grounded.

In addition, each boost power factor correction circuit 21, 22 includes a controller 211, 221. The controller 211, 221 receives a divided voltage V51, V52, and controls a turned-on time and/or a turned-off time of the boost switch Q21, Q22 according to the divided voltage V51, V52 so as to control the conversion voltage Vb. Specifically, the first boost power factor correction circuit 21 includes a first controller 211; the first controller 211 receives a first divided voltage V51, and controls a turned-on time and/or a turned-off time of the first boost switch Q21 according to the first divided voltage V51 so as to control the conversion voltage Vb. The second boost power factor correction circuit 22 includes a second controller 221; the second controller 221 receives a second divided voltage V52, and controls a turned-on time and/or a turned-off time of the second boost switch Q22 according to the second divided voltage V52 so as to control the conversion voltage Vb.

The current suppression circuit 30 is connected to the first filter-rectification circuit 10_1 and the second filter-rectification circuit 10_2, and the first boost power factor correction circuit 21 and the second boost power factor correction circuit 22. As shown in FIG. 3, the current suppression circuit 30 includes at least two diodes 321, 322 and a resistor 31. Each diode 321, 322 includes an anode and a cathode. The resistor 31 includes a first terminal and a second terminal. In particular, the number of the at least two diodes 321, 322 is equal to the number of the at least two filter-rectification circuits 10_1, 10_2 and the number of the at least two boost power factor correction circuits 21, 22. In other words, as shown in FIG. 3, the current suppression circuit 30 includes two diodes 321, 322, i.e., a first diode 321 and a second diode 322.

The anodes of the at least two diodes 321, 322 are respectively connected to the at least two filter-rectification circuits 10_1, 10_2 and the at least two boost power factor correction circuits 21, 22. The cathodes of the at least two diodes 321, 322 are commonly connected to a first node Nc1. Specifically, the anode of the first diode 321 is connected to the first filter-rectification circuit 10_1 and the first boost power factor correction circuit 21. The anode of the second diode 322 is connected to the second filter-rectification circuit 10_2 and the second boost power factor correction circuit 22. The cathode of the first diode 321 and the cathode of the second diode 322 are commonly connected to the first node Nc1. The first diode 321 is used to prevent the electric energy of the second filter-rectification circuit 10_2 and the second boost power factor correction circuit 22 from being flowed into (fed into) the first filter-rectification circuit 10_1 and the first boost power factor correction circuit 21 so as to forwardly provide the electric energy of the first filter-rectification circuit 10_1 and the first boost power factor correction circuit 21 to the output side. Similarly, second diode 322 is used to prevent the electric energy of the first filter-rectification circuit 10_1 and the first boost power factor correction circuit 21 from being flowed into (fed into) the second filter-rectification circuit 10_2 and the second boost power factor correction circuit 22 so as to forwardly provide the electric energy of the second filter-rectification circuit 10_2 and the second boost power factor correction circuit 22 to the output side.

The resistor 31 is connected between the first node Nc1 and a second node Nc2 where the conversion voltage Vb is. In one embodiment, the resistor 31 is a thermistor with a negative temperature coefficient (NTC), but the present disclosure is not limited to this.

In this embodiment, the anode of the first diode 321 is connected to the first filter-rectification circuit 10_1, and receives the first rectified voltage Vr1 filtered and rectified by the first filter-rectification circuit 10_1. The anode of the second diode 322 is connected to the second filter-rectification circuit 10_2, and receives the second rectified voltage Vr2 filtered and rectified by the second filter-rectification circuit 10_2.

The DC-to-DC conversion circuit is connected to the first boost power factor correction circuit 21, the second boost power factor correction circuit 22, and the current suppression circuit 30, and receives the conversion voltage and converts the conversion voltage Vb into an output voltage Vout to supply the power required by the system. Therefore, the at least two boost power factor correction circuits 21, 22 share a single DC-to-DC conversion circuit 40 for converting the conversion voltage Vb into the output voltage Vout.

As shown in FIG. 3, the multi-input power system further includes at least two voltage-dividing circuits 51, 52. The at least two voltage-dividing circuits 51, 52 respectively receive the conversion voltage Vb outputted from the at least two boost power factor correction circuits 21, 22, and divide the conversion voltage Vb into at least two divided voltages V51, V52. In particular, the number of the at least two voltage-dividing circuits 51, 52 is equal to the number of the at least two filter-rectification circuits 10_1, 10_2 and the number of the at least two boost power factor correction circuits 21, 22. Therefore, as shown in FIG. 3, the at least two voltage-dividing circuits 51, 52 include a first voltage-dividing circuit 51 and a second voltage-dividing circuit 52. The first voltage-dividing circuit 51 receives the conversion voltage Vb outputted from the first boost power factor correction circuit 21, and divides the conversion voltage Vb to acquire a first divided voltage V51. The second voltage-dividing circuit 52 receives the conversion voltage Vb outputted from the second boost power factor correction circuit 22, and divides the conversion voltage Vb to acquire a second divided voltage V52.

Each voltage-dividing circuit 51, 52 includes a first voltage-dividing resistor R51a, R52a and a second voltage-dividing resistor R51b, R52b. The voltage-dividing circuit 51, 52 receives the conversion voltage Vb outputted from the boost power factor correction circuit 21, 22, and divides the conversion voltage Vb according to a resistance ratio between the first voltage-dividing resistor R51a, R52a and the second voltage-dividing resistor R51b, R52b to generate divided voltages V51, V52 across the second voltage-dividing resistors R51b, R52b.

Specifically, the first voltage-dividing circuit 51 includes a first voltage-dividing resistor R51a and a second voltage-dividing resistor R51b. The first voltage-dividing circuit 51 receives the conversion voltage Vb outputted from the first boost power factor correction circuit 21, and divides the conversion voltage Vb according to a resistance ratio between the first voltage-dividing resistor R51a and the second voltage-dividing resistor R51b to generate a first divided voltage V51 across the second voltage-dividing resistor R51b. That is, $V51=Vb*(R51b/(R51a+R51b))$. The second voltage-dividing circuit 52 includes a first voltage-dividing resistor R52a and a second voltage-dividing resistor R52b. The second voltage-dividing circuit 52 receives the conversion voltage Vb outputted from the second boost power factor correction circuit 22, and divides the conversion voltage Vb according to a resistance ratio between the first voltage-dividing resistor R52a and the second voltage-dividing resistor R52b to generate a second divided voltage V52 across the second voltage-dividing resistor R52b. That is, $V52=Vb*(R52b/(R52a+R52b))$.

In addition, the multi-input power system further includes a capacitor Cb. The capacitor Cb includes a first terminal and a second terminal, and the first terminal of the capacitor Cb receives the conversion voltage Vb and the second terminal of the capacitor Cb is grounded. Therefore, the conversion voltage Vb built on the capacitor Cb is converted by the DC-to-DC conversion circuit 40 into the output voltage Vout for supplying the power required by the system.

Figure 2:
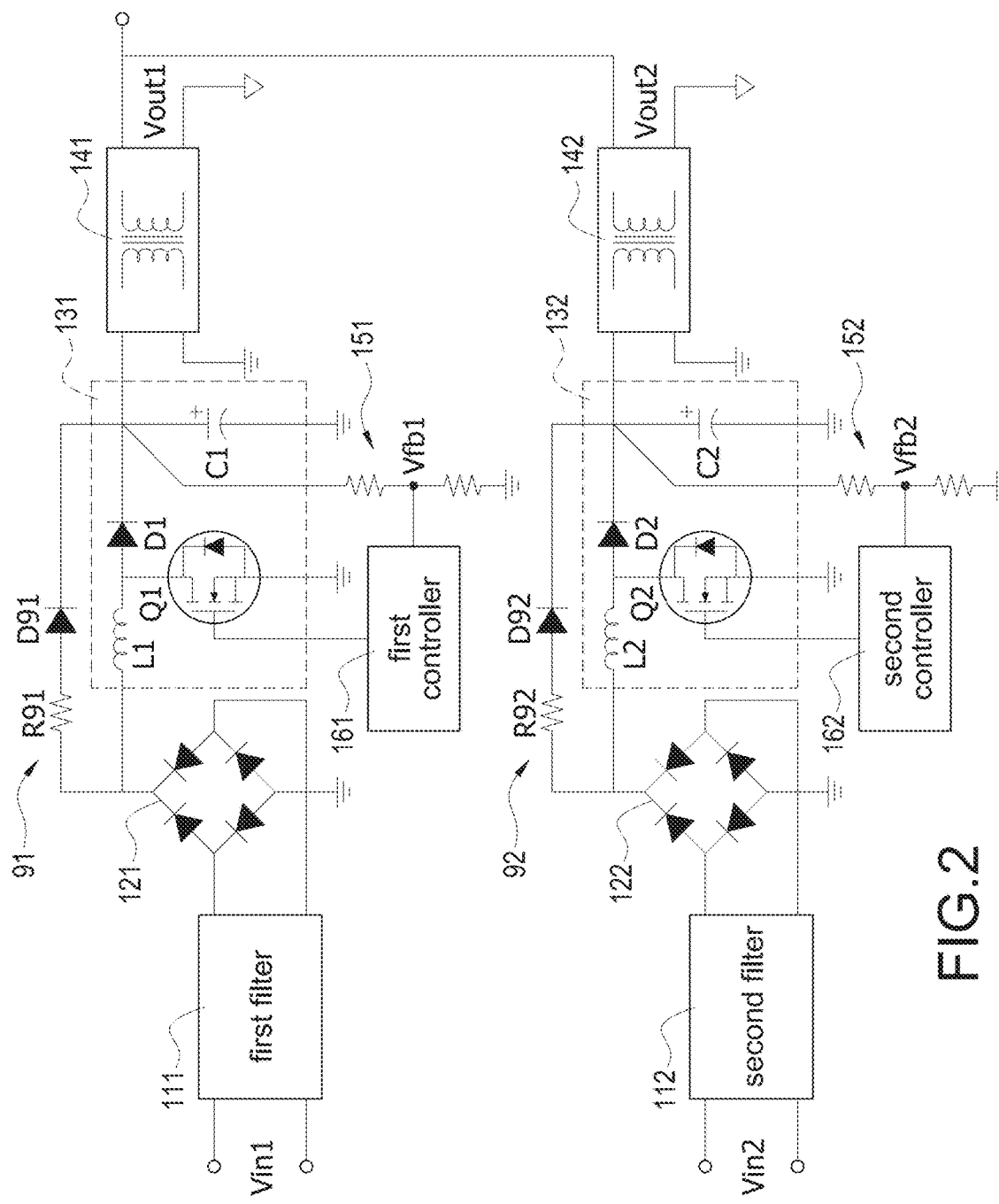
FIG. 2 is a block circuit diagram of another related-art dual-input switching power converter with an inrush current suppression circuit.

In particular, compared to the related-art circuits in FIG. 1 and FIG. 2, the system disclosed in FIG. 3 only need to use one thermistor with the negative temperature coefficient (NTC thermistor) between the diode 321, 322 (i.e., a bypass diode) and the capacitor Cb (i.e., an output capacitor). Therefore, the present disclosure can achieve the inrush current suppression function of the multi-input power system by adding only one NTC thermistor to the existing bypass diode so that this functional requirement can be achieved with the minimum number of parts/components designed.

In summary, the present disclosure has the following features and advantages:

1. The inrush current suppression function can be applied to multi-input AC and/or power structure.

2. The simplify overall power structure design can be implemented.

3. Since only one NTC thermistor is used, the design can be minimized in terms of component, cost, and volume.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A multi-input power system with an inrush current suppression function configured to receive at least two input power sources, the multi-input power system comprising:
    at least two filter-rectification circuits configured to respectively receive the at least two input power sources, and convert the at least two input power sources into at least two rectified voltages,
    at least two boost power factor correction circuits, each boost power factor correction circuit correspondingly connected to the filter-rectification circuit, and configured to receive the rectified voltage and perform a power factor correction to the rectified voltage to provide a conversion voltage,
    a current suppression circuit connected to the at least two filter-rectification circuits and the at least two boost power factor correction circuits, and
    a DC-to-DC conversion circuit connected to the at least two boost power factor correction circuits and the current suppression circuit, and the DC-to-DC conversion circuit configured to receive the conversion voltage and convert the conversion voltage into an output voltage.

2. The multi-input power system as claimed in claim 1, wherein the current suppression circuit comprises:
    at least two diodes, each diode comprising an anode and a cathode, and
    a resistor comprising a first terminal and a second terminal,
    wherein the anodes of the at least two diodes are respectively connected to the at least two filter-rectification circuits and the at least two boost power factor correction circuits, and the cathodes of the at least two diodes are commonly connected to a first node,
    wherein the resistor is connected between the first node and a second node where the conversion voltage is.

3. The multi-input power system as claimed in claim 2, wherein the anode of each diode is configured to receive the rectified voltage.

4. The multi-input power system as claimed in claim 2, wherein each boost power factor correction circuit comprises:
    a boost inductor comprising a first terminal and a second terminal,
    a boost switch comprising a first power terminal, a second power terminal, and a control terminal, and
    a boost diode comprising an anode and a cathode,
    wherein the first terminal of the boost inductor is connected to the filter-rectification circuit and the anode of the diode, and the second terminal of the boost inductor is connected to the first power terminal of the boost switch and the anode of the boost diode; the cathode of the boost diode is connected to the second node; the second power terminal of the boost switch is grounded.

5. The multi-input power system as claimed in claim 4, further comprising:
    at least two voltage-dividing circuits configured to respectively receive the conversion voltage, and divide the conversion voltage into at least two divided voltages.

6. The multi-input power system as claimed in claim 5, wherein each boost power factor correction circuit further comprises:
    a controller configured to receive the divided voltage, and control a turned-on time and/or a turned-off time of the boost switch according to the divided voltage so as to control the conversion voltage.

7. The multi-input power system as claimed in claim 5, wherein each voltage-dividing circuit comprises:
    a first voltage-dividing resistor and a second voltage-dividing resistor,
    wherein each voltage-dividing circuit is configured to correspondingly receive the conversion voltage provided from the boost power factor correction circuit, and divide the conversion voltage according to a resistance ratio between the first voltage-dividing resistor and the second voltage-dividing resistor to generate the divided voltage across the second voltage-dividing resistor.

8. The multi-input power system as claimed in claim 2, wherein the resistor is a thermistor with a negative temperature coefficient.

9. The multi-input power system as claimed in claim 1, further comprising:
    a capacitor comprising a first terminal and a second terminal, and the first terminal of the capacitor configured to receive the conversion voltage and the second terminal of the capacitor is grounded.

10. The multi-input power system as claimed in claim 1, wherein the at least two boost power factor correction circuits share the DC-to-DC conversion circuit, and are configured to convert the conversion voltage into the output voltage.

* * * * *